United States Patent [19]

George et al.

[11] 3,893,228

[45] July 8, 1975

[54] SILICON PRESSURE SENSOR

[75] Inventors: William L. George; Jack L. Saltich, both of Scottsdale, Ariz.

[73] Assignee: Motorola, Inc., Chicago, Ill.

[22] Filed: Oct. 29, 1973

[21] Appl. No.: 410,734

Related U.S. Application Data

[62] Division of Ser. No. 293,958, Oct. 2, 1972, abandoned.

[52] U.S. Cl. .......................... 29/580; 29/610; 29/591

[51] Int. Cl. .......................... B01j 17/00

[58] Field of Search ... 29/580, 591, 610 G, 576 IW, 29/25.35; 317/235 M

[56] References Cited

UNITED STATES PATENTS

| | | | |
|---|---|---|---|
| 3,230,763 | 1/1966 | Frantzis | 317/235 M |
| 3,448,354 | 6/1969 | Cohen | 29/580 |
| 3,758,830 | 9/1973 | Jackson | 317/235 M |
| 3,767,494 | 10/1973 | Muraoka | 29/591 |
| 3,786,560 | 1/1974 | Cunningham | 29/580 |

OTHER PUBLICATIONS

"Ethylene Diamine–Catechol–Water Mixture," Sept. 1969, Greenwood, J. Electro. Chem. Soc., Vol. 116, No. 9, pp. 1325–1326.

*Primary Examiner*—W. Tupman
*Attorney, Agent, or Firm*—Vincent J. Rauner; Ellen P. Trevors; Harry M. Weiss

[57] ABSTRACT

A method of fabricating a piezoresistive pressure sensor from a monocrystalline silicon wafer depends upon a boron P+ conductivity layer as an etch stop to an anisotropic etch using potassium hydroxide as the etchant. The etching is selectively done so that the inner portion of the wafer is relatively thin and the outer portion is relatively thick. The process permits the fabrication of piezoresistive pressure sensitive elements of a bridge to be formed of monocrystalline silicon in the relatively thin inner portion and also permits the fabrication of pressure insensitive elements, formed of monocrystalline silicon in the outer portion, electrically connected to the pressure sensitive elements. The resultant structure is a monocrystalline silicon wafer cut along the (110) or the (100) crystallographic plane and having at least the pressure sensitive and pressure insensitive elements of the bridge circuit as integral parts.

7 Claims, 7 Drawing Figures

SILICON PRESSURE SENSOR

This is a division, of application Ser. No. 293,958, filed Oct. 2, 1972, now abandoned.

BACKGROUND OF THE INVENTION

1. Field of the Invention

This invention pertains to transducers used to transform mechanical motion or stress into changes in electrical current representative of the amplitude of the mechanical motion or stress. More specifically, this invention relates to monocrystalline silicon material which changes resistance in response to a mechanical deformation. When the transducer is an element in a balanced bridge circuit, a change in resistance imbalances the bridge resulting in an output indicative of the mechanical motion or stress that caused the change in resistance.

2. Description of the Prior Art

The physics of piezoresistive semiconductive material is well documented in the prior art. For example, monocrystalline silicon has been extensively tested. A meaningful measure of the ability of the selected material to change resistance in response to a mechanical force is known as the "gage factor." The gage factor is defined as the fractional change in resistance per unit strain. It is mathematically defined as follows:

$$GF = \frac{dR/R_0}{dL/L_0}$$

wherein:

$R_0$ is the initial resistance $L_0$ is the initial length dR is the change in electrical resistance dL is the change in length Wire strain gages were very common prior to the discovery of properties of piezoresistive semiconductive material. The wire strain gages showed negligible conductivity modulation because of applied forces. Nevertheless, they have been the cornerstone of the strain gage technology over the years. The sensitivity exhibited by wire strain gages is much smaller than that of piezoresistive silicon, for example. Piezoresistive silicon may be many orders of magnitude more sensitive than wire strain gages. The following table sets out the gage factor for the various types of semiconductive material and the crystallographic orientation of that material.

TABLE 1

| MATERIAL | CARRIER TYPE | ORIENTATION | GF |
|---|---|---|---|
| Si | P | 111 | 175 |
| Si | N | 111 | − 5 |
| Si | N | 100 | −133 |
| Si | P | 100 | 5 |
| Si | P | 110 | 120 |
| Si | N | 110 | − 55 |
| Ge | N | 111 | −157 |
| Ge | P | 111 | 102 |
| InSb | P | 100 | − 45 |
| InSb | N | 100 | − 74 |

The maximum gage factor occurs in the [111] direction of P type silicon of resistivity greater than 1.0 ohm centimeter. It has further been determined that maximization of GF also maximizes the temperature coefficient of GF and does not minimize the nonlinearity in applied stress. These effects on GF require various tradeoffs.

BRIEF SUMMARY OF THE INVENTION

A monocrystalline silicon wafer cut along the (110) crystallographic plane is used as the basis for the pressure sensor of this invention. In the preferred embodiment, an epitaxial layer with a boron impurity is grown over the top surface of the wafer resulting in a layer of P+ type conductivity monocrystalline silicon. On top of this layer is grown another epitaxial layer but with an impurity to produce an N− type conductivity monocrystalline silicon. This N− layer is very useful for the fabrication of other semiconductive components on the wafer, but could just as easily be of a P type conductivity if it were desirable from the standpoint of the type of piezoresistive material desired to be used.

For the fabrication technique utilized in this invention, silicon cut along the (111) crystallographic plane is eliminated. Since the etching is done with potassium hydroxide (KOH), silicon cut along the (100) or (110) must be used because they both are readily and controllably etched by KOH. Material cut along the (111) crystallographic plane does not lend itself to KOH etching.

The selection of impurity to form the piezoresistive elements is then governed by the applications to which the sensor is to be put and by the need for additional semiconductors on the same wafer. In the preferred embodiment, the sensor is to be used in an atmosphere having a wide temperature range. Further, it is highly desirable to incorporate other semiconductive devices on the same wafer, and therefore the sensor elements are of a P type conductivity monocrystalline silicon cut along the (110) crystallographic plane. For other applications, it might be advantageous to select, for example, N conductivity type monocrystalline silicon cut along the (100) crystallographic plane.

In the preferred embodiment, an epitaxial layer of N− conductivity type is grown over the P+ conductivity type epitaxial layer and then P type piezoresistive pressure sensitive elements are diffused into the top surface of the N type monocrystalline silicon layer. These diffusions are made so that a pair of parallel pressure sensitive resistors will be the final result. Two other regions are also diffused into the top surface of the N type monocrystalline silicon, in the outer portions thereof, to form two piezoresistive elements which are pressure insensitive because of their placement. The four elements are electrically connected, and with appropriate input and output connections serve as a bridge circuit.

A selective KOH etch is performed from the other side of the wafer and is stopped by the P+ conductivity type monocrystalline silicon layer to provide a relatively thin inner portion and a relatively thick outer portion for the resultant structure. The piezoresistive pressure sensitive elements are thereby located in the inner portion having a relatively thin diameter and the pressure insensitive elements are located in the outer portions which are relatively thick.

Connections to the resistive elements are made by known metalization techniques to form a known balanced bridge circuit. When the pressure sensitive elements are deflected by an outside pressure, their resistance changes and the bridge circuit produces an output representative of the resistance change and therefore of the amount of pressure applied.

Using the P+ etch stop together with the anisotropic etch using KOH yields a pair of piezoresistive pressure sensitive elements that are very thin with respect to their length, providing high mechanical amplification. Also, since the elements, in absolute terms, are extremely thin, their lengths can be kept to a minimum thereby providing a complete pressure sensor which is very small compared with the prior art.

It is therefore an object of this invention to provide a pressure sensor having a relatively thin inner portion and a relatively thick outer portion, the outer portion supporting the ends of a piezoresistive, pressure sensitive sensing element, with the flexing portion supported by the thin inner portion of the wafer, and a method of manufacturing this sensor.

It is another object to provide a piezoresistive pressure sensitive element having a high ratio of length-to-thickness, and a method of manufacturing this sensor.

It is another object of this invention to provide a silicon pressure sensor having a pair of piezoresistive pressure sensitive elements of a bridge circuit supported on the ends by a relatively thick section of a monocrystalline silicon wafer and supported in the flexing portions by a relatively thin portion of the monocrystalline wafer and further having pressure insensitive elements of the bridge circuit appropriately connected to the pressure sensitive element supported wholly by the relatively thick section and a method of manufacturing this sensor.

It is still another object of this invention to provide a method for producing silicon pressure sensors that is of high yield and reliability.

These and other objects will be made more evident in the detailed description that follows.

DETAILED DESCRIPTION OF THE INVENTION

Figure 1A:
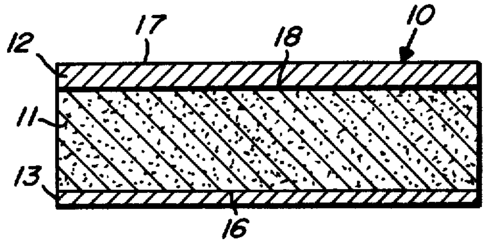
FIGS. 1*a*–1*d*, in cross-section, illustrate the steps in fabricating the silicon pressure sensor.

FIG. 1*a* illustrates monocrystalline silicon wafer 10, cut along the (110) crystallographic plane, having a body 11 with a protective layer 13 of silicon nitride ($Si_3N_4$) having been deposited on surface 16. Layer 12 of boron doped P type conductivity material is shown having been epitaxially grown on surface 18 of body 11.

Figure 1B:
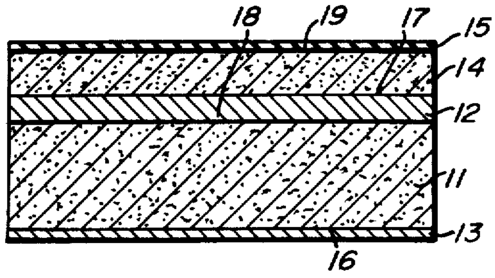

FIG. 1*b* illustrates epitaxial layer 14 having been grown over surface 17 of P+ type conductivity epitaxial layer 12. In the preferred embodiment, epitaxial layer 14 is comprised of N- type conductivity material. A layer 15 of silicon dioxide ($SiO_2$) is shown having been deposited over surface 19 of epitaxial layer 14.

Figure 1C:
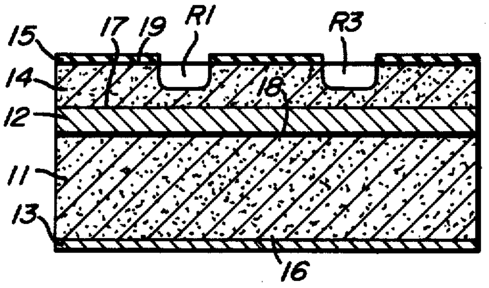
Figure 2:
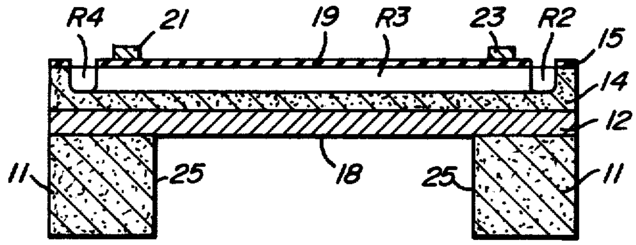
FIG. 2, in cross-section, illustrates the silicon pressure sensor turned 90° from FIGS. 1*a*–1*d*.

FIG. 1c illustrates a photoresist mask having been applied to $SiO_2$ layer 15 in a well-known manner followed by appropriate etching and a diffusion of selected impurities into the top surface 19 of epitaxial layer 14 to form piezoresistive pressure sensitive elements $R_1$ and $R_3$ and pressure insensitive elements $R_2$ and $R_4$ (FIG. 2). In the preferred embodiment, the material diffused produces a P conductivity type piezoresistive element.

Next, a photoresistive pattern is applied to the $Si_3N_4$ layer 13 in a well-known manner, permitting the removal of a selected portion of the layer 13. Then the top surface containing resistors $R_1$–$R_4$ is protected by insertion into wax. A KOH etch is started at surface 16 resulting in an etch at an angle to the boron P+ layer 12 as shown by sloped walls 24 of FIG. 1*d*. The remaining silicon nitride and the photoresist is then removed. Finally, through known techniques, metal is deposited and selectively etched to form terminals 20 and 21 as shown in FIG. 1*d* and terminals 22 and 23 as shown in FIG. 3.

Figure 1D:
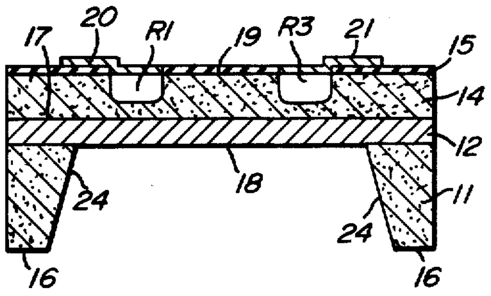

FIG. 2 is a cross-section showing FIG. 1*d* having been turned 90°. This figure illustrates the pressure insensitive elements $R_2$ and $R_4$. It also illustrates that the KOH etch mentioned above, in the case of (110) material produces the slope 24 of FIG. 1d in one direction and a vertical wall 25 in the other. If (100) material had been used, walls 25 would also be sloped like walls 24.

Figure 3:
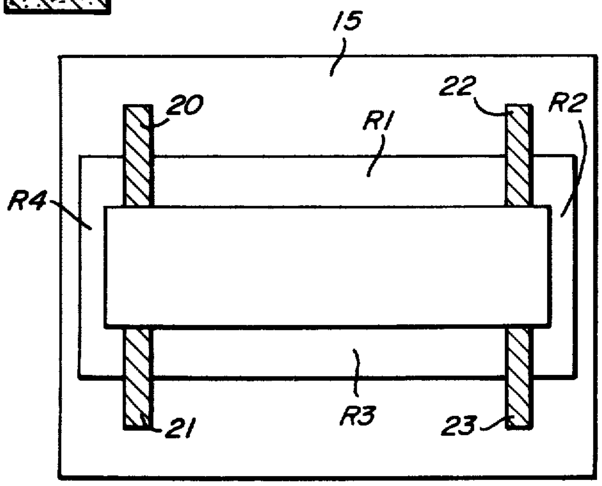
FIG. 3 is a top view of the pressure sensor.

FIG. 3 is a top view of the finished pressure sensor. It illustrates that in the preferred embodiment elements $R_1$, $R_2$, $R_3$ and $R_4$ are contiguous having terminals 20, 21, 22 and 23 appropriately placed to form an appropriate balanced bridge network as shown in FIG. 4.

Figure 4:
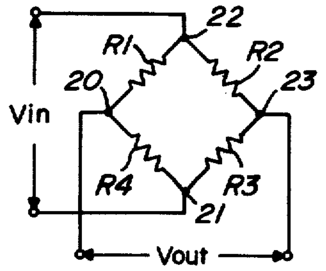
FIG. 4 is a schematic diagram of the bridge circuit which includes the pressure sensitive and pressure insensitive elements.

FIG. 4 is a schematic illustrating that Vin is applied to terminals 21 and 22 and Vout is taken from terminals 20 and 23. When $R_1$ and $R_3$ are not subjected to pressure, Vout is equal to zero by proper selection of resistance. When $R_1$ and/or $R_3$ are deflected by pressure, the resistance changes and Vout is no longer zero.

The resultant silicon pressure sensor as shown in FIGS. 1d, 2 and 3 is unique in its dimensions because of the method of fabrication. That is, the length of piezoresistive pressure sensitive elements $R_1$ and $R_3$ is 35 mils or less and the total thickness of the center portion including both epitaxial layers 12 and 14 is approximately 0.5 mil, permitting a maximum dimension of the finished sensor of not more than 50 mils. These dimensions are not obtainable by known prior techniques.

We claim:

1. A method of manufacturing a silicon pressure sensor from a monocrystalline silicon wafer cut along a prescribed crystallographic plane, comprising the steps of:

a. forming a first layer of a first conductivity type moncrystalline silicon at one surface of the wafer;
b. forming a second layer of a second conductivity type monocrystalline silicon over the first layer;
c. forming at least one elongated piezoresistive pressure sensitive element of the bridge circuit by forming a first conductivity type section of monocrystalline silicon in a prescribed region at the surface of the second layer;
d. forming elongated pressure insensitive elements of the bridge circuit by forming a first conductivity type section of monocrystalline silicon at the surface of the second layer at each end of said pressure sensitive element and connected thereto;
e. selectively etching the wafer from the other surface to provide a relatively thin elongated region to support the piezoresistive pressure sensitive element of the bridge circuit while leaving unetched spaced portions of the wafer underlying the pressure insensitive elements to provide a relatively thick region to support the pressure insensitive elements of the bridge circuit; and f. interconnecting the elements of the bridge circuit to produce an output when the pressure sensitive element is subjected to pressure.

2. The method of claim 1 wherein the first layer is of P conductivity type, the second layer is of N conductivity type, and the pressure sensitive and pressure insensitive elements are of P conductivity type.

3. The method of claim 2 wherein the step of forming the first layer further comprises growing an epitaxial layer over the one surface of the wafer.

4. The method of claim 3 wherein the step of forming the second layer further comprises growing an epitaxial layer over the first layer.

5. The method of claim 4 wherein the steps of forming at least one piezoresistive pressure sensitive element and the pressure insensitive elements further comprises diffusing a selected impurity into the second layer at prescribed regions to form the elements of a P type conductivity.

6. The method of claim 5 wherein the wafer is cut along the (110) crystallographic plane.

7. The method of claim 1 wherein two parallel piezoresistive pressure sensitive elements are formed and two parallel pressure insensitive elements are formed.

* * * * *